Figure 2:
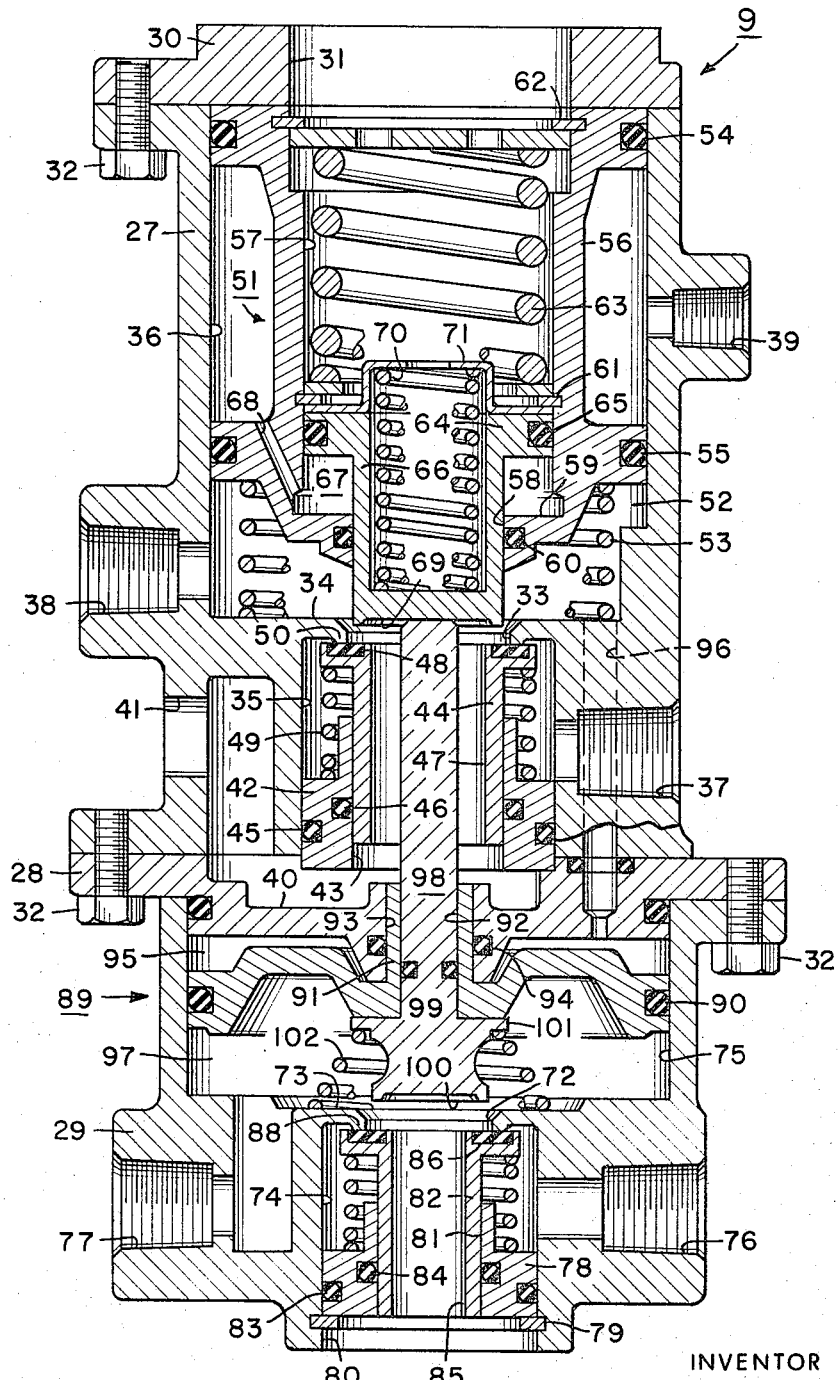

Dec. 13, 1966    R. C. BUELER    3,291,539
CONTROL VALVE
Original Filed Jan. 4, 1965    2 Sheets-Sheet 1
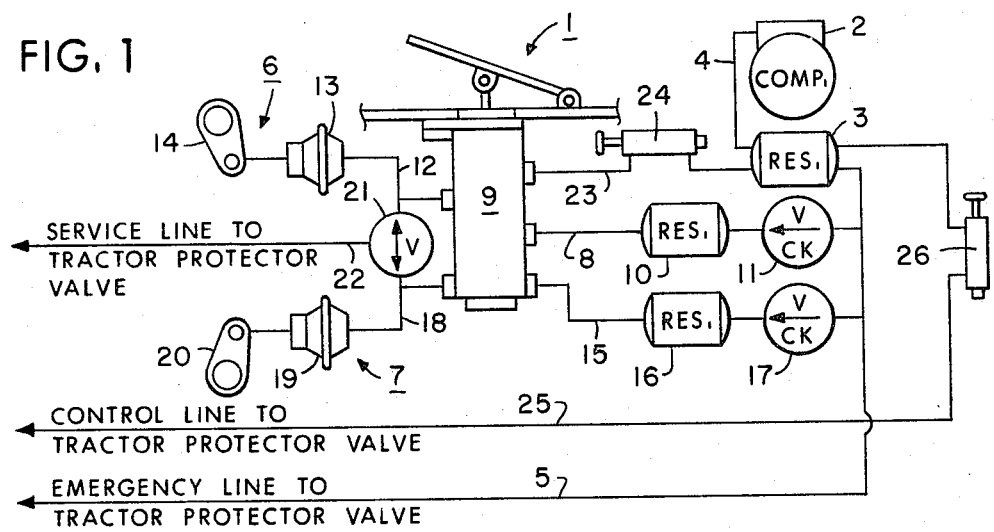
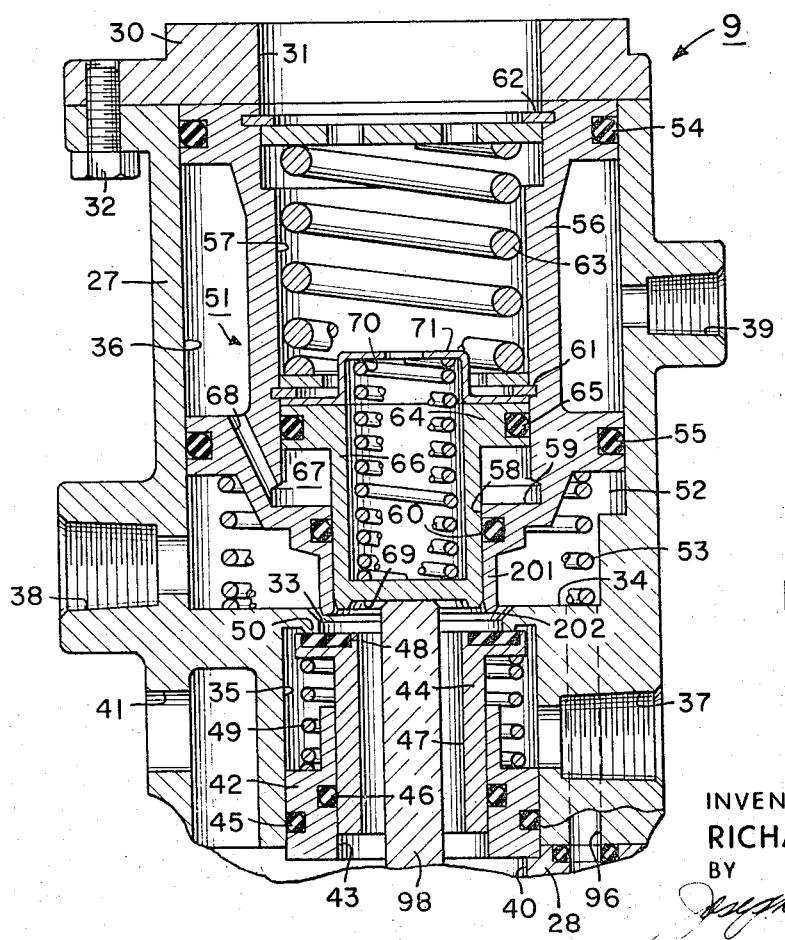
INVENTOR
RICHARD C. BUELER
BY
Joseph E. Papin Dec. 13, 1966  R. C. BUELER  3,291,539
CONTROL VALVE Original Filed Jan. 4, 1965  2 Sheets-Sheet 2

INVENTOR
RICHARD C. BUELER
BY
Joseph E. Papin.

United States Patent Office 3,291,539
Patented Dec. 13, 1966

3,291,539
CONTROL VALVE
Richard C. Bueler, Glendale, Mo., assignor to Wagner
Electric Corporation, St. Louis, Mo., a corporation of
Delaware
Continuation of application Ser. No. 423,080, Jan. 4,
1965. This application Mar. 17, 1966, Ser. No. 535,253
18 Claims. (Cl. 303—52)

This is a continuation of application Serial No. 423,080, filed January 4, 1965, and now abandoned.

This invention relates to dual fluid pressure systems for vehicles and in particular to control valves therefor having emergency means therein for automatically actuating said systems.

In the past, various types of dual or tandem control valves were utilized to effect the energization of separate or dual fluid pressure systems, such as those utilized on tractor-trailer vehicle combinations, and such dual control valves and systems were required by law as safety features on vehicles operating in certain states; however, an undesirable or disadvantageous feature of such past dual control valves and systems was manifested in the inability of the vehicle operator to actuate said systems in the event the operator treadle or treadle linkage to said control valves was lost, disengaged, broken, or for some other reason became inoperable to effect the actuation of said control valves and the resulting energization of said systems.

The object of the present invention is to provide a novel control valve means for use in a dual fluid pressure system which overcomes the aforementioned undesirable or disadvantageous feature and others, and this and other objects and advantageous features of the present invention will become apparent hereinafter.

Briefly, the invention embodies a control valve actuated in response to an applied force for normally energizing the separate branches of a dual fluid pressure system including means actuated in response to a predetermined minimum system fluid pressure to effect automatic energization of said separate system branches. The invention also embodies means for positively energizing one of said branches in the event of fluid pressure failure in the other of said branches.

In the drawings which illustrate embodiments of the invention,

FIG. 1 is a diagrammatic view of a fluid pressure system having control valve means therein embodying the present invention, FIG. 2 is a greatly enlarged cross-sectional view of the control valve of FIG. 1, and FIG. 3 is a fragmentary view of another control valve for use in the system of FIG. 1 illustrating another embodiment of the present invention.

Referring now to the drawings and in particular to FIG. 1 thereof, a dual or separate fluid pressure system 1, such as that utilized on the tractor of a tractor-trailer vehicle combination, is shown having fluid pressure generating means, such as a compressor 2, connected with a system or main reservoir 3 by a conduit 4, and an emergency line 5 is connected between said main reservoir and the emergency port of a tractor protector valve (not shown) of the type well known to the art, such as that disclosed in U.S. Patent No. 2,859,762, issued November 11, 1959, to Cyril B. Fites, said emergency line being adapted for operative connection through said tractor protector valve with the emergency portion of the usual trailer braking system, also well known in the art, as illustrated in the aforementioned patent. The system 1 is also provided with separate fluid pressure branches, indicated generally at 6 and 7, for connection with separate axle sets of wheel brake assemblies (not shown) on said tractor. The branch 6 includes a conduit 8 connected in parallel circuit relation between the emergency line 5 and one of a pair of separate inlet ports of a treadle operated tandem control or application valve 9 having a branch or protected reservoir 10 interposed therein, and a uni-directional check valve 11 is connected in the conduit 8 to provide for uni-directional pressure fluid flow from said main reservoir to said protected reservoir. The control valve 9 is also provided with a pair of separate outlet ports, and a tractor service line or conduit 12 connects one of said outlet ports with a fluid pressure responsive motor or brake chamber 13 which is operatively connected with linkage means, such as a slack adjustor 14, to control the energization of a friction device or wheel brake assembly on one tractor axle (not shown). The branch 7 includes a conduit 15 connected in parallel circuit relation between the emergency line 5 and the other of the inlet ports of the control valve 9 having another branch or protected reservoir 16 interposed therein, and a uni-directional check valve 17 is connected in the conduit 15 to provide for uni-directional pressure fluid flow from the main reservoir to the protected reservoir 16. Another tractor service line or conduit 18 is connected between the other of the outlet ports of the control valve 9 and another fluid pressure responsive motor or brake chamber 19 which is operatively connected with linkage means, such as slack adjustor 20, to control the energization of another friction device or wheel brake assembly on another tractor axle (not shown). A two-way valve 21 is connected between the tractor service lines 12, 18 to provide pressure fluid flow from either thereof to another conduit or service line 22 which is connected with the service port of the aforementioned tractor protector valve, said service line 22 being adapted for operative connection through said tractor protector valve with the service portion of the aforementioned, usual, trailer braking system. Another conduit 23 is connected between the main reservoir 3 and a control or emergency port of the control valve 9, and a push-pull hand valve 24 of a type well known to the art is interposed in said conduit 23, said push-pull valve being manually operable between a charging position connecting said control port in pressure fluid communication with said main reservoir and a venting position interrupting pressure fluid communication between said control port and main reservoir and venting said control port to the atmosphere. To complete the description of the system 1, another conduit 25 is connected between the main reservoir 3 and the control port or portion of the aforementioned tractor protector valve having another push-pull hand valve 26 interposed therein, said push-pull valve 26 being similar to the push-pull valve 24 and being manually operable between a charging position connecting said main reservoir in pressure fluid communication with the control portion of said tractor protector valve to thereby effect open pressure fluid communication between the service and emergency lines 22, 25 of the tractor and those of the aforementioned, usual, trailer braking system and a venting position for venting the control portion of said tractor protector valve to the atmosphere thereby interrupting the pressure fluid communication between the service and emergency lines 22, 25 of the tractor and those of the trailer braking systems.

The control valve 9, FIG. 2, is provided with upper, intermediate and lower housings 27, 28 and 29 and a closure member 30 for said upper housing having a guide opening 31 therethrough to receive the force transmitting linkage of an operator controlled treadle or lever (not shown), said housings and closure member being interconnected by suitable means, such as studs 37.

The upper housing 27 is provided with a bore 33 defining an annular wall or partition 34 axially positioned between counterbores 35, 36, said counterbore 35 forming an inlet chamber. Inlet and outlet ports 37, 38, which receive the conduits 8, 12, as previously mentioned, are provided in the upper housing 27 connecting with the counterbores 35, 36, respectively, and a control port 39 is also provided in said upper housing 27 connecting with the counterbore 36 between the outlet port 38 and the open end of said counterbore. A recess 40 is provided in the intermediate housing 28 beneath the counterbore 35 defining an exhaust chamber in combination with an exhaust port 41 provided in the upper housing 27. A valve guide member 42 is received in the counterbore 35 and is normally seated on the intermediate housing 28. The valve guide member 42 is provided with a bore 43 in which an inlet valve element 44 is slidable, and seals 45, 46 are carried by said valve guide member in sealing engagement with the counterbore 35 and said inlet valve element, respectively. The inlet valve element is provided with an axial bore or exhaust opening 47 therethrough, and an annular resilient sealing member or disc 48 is provided on one end of said valve element in circumscribing relation with said exhaust opening. A valve spring 49 is biased between the valve guide member 42 and the inlet valve 44 normally urging the valve seal 48 into sealing engagement with a valve seat 50 formed on the wall 34 in circumscribing relation with the housing bore 33.

An application member or reaction piston, indicated generally at 51, is slidably received in the housing counterbore 36 between the outlet and control ports 38, 39 defining with the housing wall portion 34 an outlet chamber 52 in open pressure fluid communication with said outlet port, and a return spring 53 is interposed between the wall 34 and said reaction piston normally urging said reaction piston toward abutment with the closure member 30. Spaced seals 54, 55 are carried in the reaction piston 51 in sealing engagement with the housing counterbore 36, and a peripheral groove 56 is provided in said reaction piston between said seals in open pressure fluid communication with the control port 39 at all times. Axially stepped bores 57, 58 are provided through the reaction piston 51 having a radial shoulder 59 formed therebetween, and a seal 60 is disposed in the smaller stepped bore 58. Snap ring and groove assemblies 61, 62 are respectively provided adjacent the mid-portion and upper end of the larger stepped bore 57, and pre-compressed metering spring and retainer assembly 63 is slidably contained within said larger stepped bore 57 in abutment with said snap rings 61, 62. An emergency or control piston 64 is slidably received in the larger stepped bore 57 having a peripheral seal 65 in sealing engagement therewith, and said control piston is provided with an integral extension 66 slidably received in the smaller stepped bore 58 in sealing engagement with the seal 60. An expansible emergency or control chamber 67 is defined in the larger stepped bore 57 between the control piston 64 and the reaction piston shoulder 59, and a passage 68 is provided in the reaction piston 51 in open pressure fluid communication between the reaction piston peripheral groove 56 and said control chamber. The lower or free end of the extension 66 extends into the outlet chamber 52 having a valve seat 69 thereon for operative engagement with the valve element 44, and an emergency spring 70 has one end connected with the control piston 64 and the other end thereof contained by a cup-shaped retainer 71 urging said retainer into displacement preventing engagement with the snap ring 61.

The lower housing 29 is provided with a bore 72 defining an annular wall or partition 73 axially positioned between counterbores 74, 75, said counterbore 74 forming an inlet chamber. Another inlet and outlet port 76, 77 which receive conduits 15, 18, as previously mentioned, are provided in the lower housing 29 connecting with the counterbores 74, 75, respectively. Another valve guide member 78 is positioned in the counterbore 74 against displacement therefrom by a snap ring and groove assembly 79 provided adjacent the lower end of said counterbore, and said lower end of said counterbore forms another exhaust port 80. The valve guide member 78 is provided with a bore 81 in which another inlet valve element 82 is slidable, and seals 83, 84 are carried by said valve guide member in sealing engagement with the counterbore 74 and said inlet valve element, respectively. The inlet valve 82 is provided with an axial bore or exhaust opening 85 therethrough and has an annular resilient sealing member or disc 86 on one end thereof in circumscribing relation with said exhaust opening. A valve spring 87 is biased between the valve guide member 78 and the inlet valve 82 normally urging the sealing disc 86 into sealing engagement with a valve seat 88 which is formed on the wall 73 in circumscribing relation with the housing bore 72. The inlet, outlet and exhaust ports 37, 38 and 41 form one separate set of ports in the upper housing 27 and the inlet, outlet and exhaust ports 76, 77 and 80 form another separate set of ports in the lower housing 29.

Another application member or relay piston, indicated generally at 89, is slidable in the counterbore 75 and carries a peripheral seal 90 in sealing engagement with said counterbore. An extension 91 having a bore 92 therein is integrally formed with the relay piston 89 and slidably received in a bore 93 provided through the intermediate housing 28, and a seal 94 disposed in said intermediate housing bore is sealably engaged with the periphery of said relay piston extension. An expansible application chamber 95 is defined in the counterbore 75 between the upper end of the relay piston 89 and the intermediate housing 28, and a passage 96 in the housings 27, 28 connects the outlet chamber 52 in pressure fluid communication with said actuating chamber 95; and, another outlet chamber 97 is defined in the counterbore 75 between the lower end of the relay piston 89 and the housing wall 73 in pressure fluid communication with the outlet port 77. A relay piston rod 98 having a seal 99 disposed thereon is reciprocally received in the relay piston extension bore 92, and the upper end of the said rod extends through the exhaust opening 47 of the valve member 44 into engagement with the control piston extension 66 while the lower end thereof defines a valve seat 100 in the outlet chamber 97 for engagement with the inlet valve 82. An abutment 101 is provided on the rod 98 adjacent the lower end thereof for engagement with the relay piston 89, and a return spring 102 which is biased between said rod and the housing wall 73 normally urges said rod abutment into engagement with said relay piston while also maintaining the rod valve seat 100 in predetermined spaced relation with the inlet valve 82.

Under normal operating conditions with the push-pull valves 24, 26 in the charging positions thereof, fluid pressure generated by the compressor 2 flows through the conduit 4, the main reservoir 3, and the conduit and push-pull valve 23, 24 into the control port 39 of the control valve 9 and therefrom through the reaction piston peripheral groove and passage 56, 68 into the control chamber 67. The fluid pressure so established in the control chamber 67 acts on the effective area of the control piston 64 therein to establish an emergency force acting against the compressive force of the emergency spring 70 to move said emergency piston upwardly in the reaction piston bore 57 to its inoperative position in abutting engagement with the spring retainer 71 and the snap ring 61. The fluid pressure so generated by the compressor 2 also flows from the main reservoir 3 through the control line and push-pull valve 25, 26 to the control portion of the tractor protector valve and also through the emergency line 5 to the emergency portion of the tractor protector valve. From the emergency line 5, the fluid pressure flows through the conduit 8, the uni-directional valve 11 and protected reservoir 10 of the system branch 6 into the inlet port 37 of the control valve 9 and therefrom into the inlet chamber 35, and fluid pressure also flows from said emergency line through the conduit 15, the un-directional valve 17 and protected reservoir 16 of the system branch 7 into the inlet port 76 of the control valve 9 and therefrom into the inlet chamber 74. From the foregoing, it is apparent that the reservoirs 10, 16 are protected reservoirs since the uni-directional valves 11, 17 protect said reservoirs against loss of fluid pressure therefrom due to a malfunctioning compressor and/or leaks or the like in the system 1 ahead of the reservoirs 10, 16. With the fluid pressure so established in the protected reservoirs 10, 16 and the emergency chamber 67 of the control valve 9, the component parts of said control valve are now positioned as shown in FIG. 2.

If the operator desires to effect a braking application under normal operating conditions, a manually applied force on the metering spring assembly 63 concertly moves the reaction piston 51 and the relay piston rod 98 downwardly against the compressive forces of the return springs 53, 101. This downward movement initially engages the valve seat 69 of the control piston 64 with the inlet valve 44 closing the exhaust passage 47 thereof and isolating the outlet chamber 52 from the atmosphere while also moving the rod 98 relative to the relay piston 89 and the valve seat 99 thereon toward the inlet valve 82. Further downward movement of the reaction piston 51 urges the inlet valve 44 against the valve spring 49 to a position disengaged from the valve seat 50 to establish pressure fluid communication between the inlet and outlet ports 37, 38. The pressure fluid flows in the system branch 6 from the inlet port 37 through the inlet chamber 35, the connecting passage 33, the outlet chamber 52 and the outlet port 38 into the service line 12 to actuate the brake chamber 13 which, in turn, rotates the slack adjustor 14 to energize the wheel brake assembly associated therewith. At the same time, the pressure fluid so established in the outlet chamber 52 also flows therefrom through the housing passage 96 into the application chamber 95 and acts on the effective area of the relay piston 89 therein to create an application force which moves said relay piston into engagement with the abutment 101 on the rod 98, and said relay piston and rod are thereafter concertly movable against the return spring 102 to engage the valve seat 99 with the inlet valve 82 thereby closing the inlet valve exhaust opening 85 and isolating the outlet chamber 97 from the atmosphere. Further concert downward movement of the relay piston and rod 89, 98 moves the inlet valve 82 against the valve spring 87 to a position disengaged from the valve seat 88 and establishing pressure fluid communication between the inlet and outlet ports 76, 77. Pressure fluid also flows in the system branch 7 from the outlet port 76 through the inlet chamber 74, the connecting passage 72, the outlet chamber 97 and the outlet port 77 into the service line 18 to actuate the brake chamber 19 which, in turn, rotates the slack adjustor 20 to energize the wheel brake assembly associated therewith. Of course, the two-way valve 21 functions in response to applied fluid pressure in either of the service lines 12, 18 to provide passage thereof through the conduit 22 to the service portion of the tractor protector valve to effect service energization of the trailer brake system in the usual manner.

When the reaction force created by the established fluid pressure in the outlet chamber 52 acting on the effective area of the reaction piston 51 equals the manually applied force, said reaction piston is moved upwardly against the metering spring assembly 63 wherein the inlet valve 44 is positioned in lapped engagement with the housing valve seat 50 and the control piston valve seat 69 is positioned in lapped engagement with said inlet valve. The reaction force acting through the metering spring 63 against the manually applied force affords the operator a direct and accurate "feel" as to the extent of the braking effort or application. Similarly, when the reaction force created by the established fluid pressure in the outlet chamber 97 acting on the effective area of the relay piston 89 equals the application force, said relay piston and rod 98 are also moved upwardly wherein the inlet valve 82 is positioned in lapped engagement with the housing valve seat 88 and the rod valve seat 89 is positioned in lapped engagement with said inlet valve. If greater braking application is desired, the manually applied force is increased which results in increased application force, and the component parts of control valve 9 function in the same manner, as previously described, to again move said component parts to their lapped positions.

When the desired braking effort is attained, the manually applied force is removed from the reaction piston 51 and the return springs 49, 53 move the valve element 44 and said reaction piston upwardly to their original positions. Initially, this upward movement sealably engages the valve element 44 with the housing valve seat 50 to interrupt pressure fluid communication between inlet and outlet ports 37, 38, and further upward movement of the reaction piston 51 disengages the control piston valve seat 69 from said valve element to re-establish communication between the outlet port 38 and the atmosphere and de-energize the wheel brake assemblies associated therewith by exhausting fluid pressure from the brake chamber 13 through the service line 12, said outlet port, the outlet chamber 52, the inlet valve exhaust opening 47, the recess 40 in the intermediate housing 28 and the exhaust port 41 in the upper housing 27. At the same time, the fluid pressure is also exhausted from the application chamber 95 through the housing passage 96 into the outlet chamber 52 and therefrom to the atmosphere, as previously described, to eliminate the application force on the relay piston 89. Upon the elimination of the application force, the compressive forces of the return springs 87, 102 move the valve element 82 and the relay piston and rod 89, 98 upwarly to their original positions. Initially, this upward movement sealably re-engages the valve element 82 with the housing valve seat 88 to interrupt pressure fluid communication between the inlet and outlet ports 76, 77, and further upward movement of the relay piston and rod 89, 98 disengages the rod valve seat 99 from the valve element 82 to re-establish communication between the outlet port 77 and the atmosphere and de-energize the wheel brake assembly associated therewith by exhausting fluid pressure from the brake chamber 19 through the service line 18, said outlet port, the outlet chamber 97, and the valve member exhaust passage 85 to the exhaust port 80. Of course, the two-way valve 21 functions to provide simultaneous exhaustion of the service line 22 to either of the tractor service lines 12, 18, thereby also effecting exhaustion of the service portions of the trailer braking system in the usual manner.

Under emergency conditions when the fluid pressure in the main reservoir is reduced or lost due to a maulfunctioning compressor and/or leaks or the like in the system 1 ahead of the protected reservoirs 10, 16, the fluid pressure in the emergency chamber 67 of the control valve 9 is correspondingly reduced, along with the emergency force acting on the emergency piston 64. When the fluid pressure in the emergency chamber 67 is so reduced to a predetermined minimum value, the compressive force of the emergency spring 70 overcomes the opposing reduced emergency force and moves the emergency piston 64 downwardly in the reaction piston bores 57, 58 relative to the reaction piston 51 to engage the emergency piston valve seat 69 with the valve element 44 closing the exhaust passage 47 therein. Further independent downward movement of the emergency piston 64 by the emergency spring 70 disengages the inlet valve 44 from the housing valve seat 34 to automatically establish pressure fluid communication between the inlet and outlet ports 37, 38, and the relay piston and rod 89, 98 are also movable in response to the fluid pressure automatically established in the outlet chamber 53 and the application chamber 95 to engage and move the inlet valve 82 to a position disengaged from the housing valve seat 88 thereby automatically establishing pressure fluid communication between the inlet and outlet ports 76, 77, as previously described hereinabove. Since the protected reservoirs 10, 16 are protected against a depletion or reduction of the fluid pressure therein by the uni-directional check valves 11, 17 when the fluid pressure in the main reservoir 3 is reduced or depleted, it is obvious that such energization of the wheel brake assemblies under these emergency conditions is effected under full reservoir pressure from the protected reservoirs 10, 16.

In the event that the operator treadle or treadle linkage (not shown) is lost, broken, disengaged from the control valve 9 or for some other reason becomes inoperative for transmitting the applied force to the reaction piston 51, the operator can manually actuate the system 1 to effect or simulate emergency conditions by manually moving push-pull valve 24 to the venting position thereof to interrupt pressure fluid communication between the main reservoir 3 and the emergency port 39 of the control valve 9 and exhaust said emergency port to the atmosphere. When the system 1 is manually actuated in this manner to effect an emergency condition, fluid pressure in the emergency chamber 67 is vented to the atmosphere through the reaction piston peripheral groove and passage 56, 68, the emergency port 39 and the conduit 23 through the push-pull valve 24. Exhaustion of the fluid pressure from the emergency chamber 67 eliminates the emergency force on the emergency piston 64 thereby permitting the opposing force of the emergency spring 70 to move said emergency piston relative to the reaction piston 51 and effect automatic actuation of the valve elements 44, 82 under emergency conditions, and the relay piston and rod 89, 98 are also automatically responsive to the fluid pressure established in the application chamber 95 under such emergency conditions to actuate the inlet valve 82, as described hereinbefore.

In the event of fluid pressure failure due to leaks or the like in one of the system branches 6 or 7, it is obvious that the fluid pressure in the main reservoir 3 will be thereby reduced in an attempt to replenish the depleted fluid pressure in one of the protected reservoirs 10, 16; therefore, when the fluid pressure in the main reservoir 3 is so reduced to the aforementioned predetermined minimum value, the emergency piston 67 and the rod 98 are moved by the emergency spring 70 to effect automatic actuation of the valve elements 44, 82 and establish pressure fluid communication between one of the inlet and outlet ports 37, 38 or 76, 77. In this manner, the wheel brake assemblies of one of the tractor axles are energized under such emergency conditions.

Referring now to FIG. 3 the reaction piston 51 is provided with an extension 201 having a valve seat 202 on the lower or free end thereof for operative engagement with the valve element 44, and the smaller stepped bore 58 of said reaction piston extends coaxially through said extension and valve seat. The emergency piston extension 66 is slidably received in the smaller stepped bore 58 in sealing engagement with the seal 60, and the valve seat 69 on the free end thereof is adapted for operative engagement with the valve element 44 only under the aforementioned emergency conditions. Under normal operating conditions, FIGS. 2 and 3, the applied force concert movement of the reaction and emergency pistons 51, 64 engages valve seat 202 with the valve element 44 to effect the normal actuation of said valve element and the relay piston and rod 89, 98 are responsive to establish fluid pressure in the application chamber 95 to actuate the valve element 82, as previously described hereinbefore.

Under the aforementioned emergency conditions when the fluid pressure in the main reservoir 3 is reduced to a predetermined minimum value, the emergency spring 70 overcomes the reduced emergency force to move the emergency piston 64 downwardly relative to the reaction piston 51 to engage the valve seat 69 with the valve element 44 and automatically actuate said valve element and automatically establish pressure fluid communication between the inlet and outlet ports 37, 38, as previously described. Of course, the relay piston and rod 89, 98 are automatically responsive to the fluid pressure automatically established in the application chamber 95 to automatically actuate the inlet valve 82, as previously described hereinbefore.

From the foregoing, it is now apparent that a novel control valve and system meeting the objects and advantages set out hereinbefore are provided and that changes or modifications to the precise configurations, shapes or details of the constructions set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing having a control port and a pair of sets of ports therein, each port set including inlet and outlet ports, a pair of valve means controlling pressure fluid communication between the ports of said ports sets, respectively, valve control means movable in said housing for operative engagement with one of said valve means including a pair of relatively movable members defining therebetween an expansible fluid pressure control chamber in pressure fluid communication with said control port, said valve control means being movable in response to an applied force to engage and move said one valve means to a position establishing pressure fluid communication between the ports of one of said port sets, other valve control means movable in said housing for operative engagement with the other of said valve means and defining with said housing another expansible fluid pressure chamber in pressure fluid communication with the outlet port of said one port set, said other valve control means being movable in response to fluid pressure established at the outlet port of said one port set to engage and move said other valve means to a position establishing pressure fluid communication between the ports of the other of said port sets, resilient means urging one of said members independently of the other thereof when the fluid pressure at said control port is less than a predetermined valve to engage and automatically actuate said one valve means, said other valve control means also being responsive to fluid pressure automatically established at the outlet port of said one port set to automatically actuate said other valve means, and said other valve control means including means movable in said housing and defining therewith said other chamber, other means extending through said last named means for concerted and relative movement therewith, and opposed portions on said other means for respective driven engagement with said one member and operative engagement with said other valve means, said other means being concertedly movable with said last named means in response to fluid pressure in said other chamber to engage one of said opposed portions with said other valve means to effect actuation thereof, and said other means also being movable relative to said last named means to actuate said other valve means in response to movement of said one member into driving engagement with the other of said opposed portions.

2. A control valve comprising a housing having a control port and a pair of sets of ports therein, each port set including inlet and outlet ports, a pair of valve means controlling pressure fluid communication between the ports of said port sets, respectively, valve control means movable in said housing for operative engagement with one of said valve means including a pair of relatively movable members defining therebetween an expansible fluid pressure control chamber in pressure fluid communication with said control port, said valve control means being movable in response to an applied force to engage and move said one valve means to a position establishing pressure fluid communication between the ports of one of said port sets, other valve control means movable in said housing for operative engagement with the other of said valve means and defining with said housing another expansible fluid pressure chamber in pressure fluid communication with the outlet port of said one port set, said other valve control means being movable in response to fluid pressure established at the outlet port of said one port set to engage and move said other valve means to a position establishing pressure fluid communication between the ports of the other of said port sets, resilient means urging one of said members independently of the other thereof when the fluid pressure at said control port is less than a predetermined value to engage and automatically actuate said one valve means, said other valve control means also being responsive to fluid pressure automatically established at the outlet port of said one port set to automatically actuate said other valve means, an exhaust opening in said one valve means normally venting the outlet port of said one port set to the atmosphere and being closed upon the engagement of said first named valve control means with said one valve means, said other valve control means including a relay piston slidable in said housing and defining therewith said other chamber, rod means slidable in said relay piston and extending through said exhaust opening, said rod means having opposed ends thereon, an abutment on one of said opposed ends for driven engagement with said one member and the other of said opposed ends defining a valve seat for operative engagement with said other valve means, and abutment means on said rod means for engagement with said relay piston, said abutment means providing concerted movement of said rod means with said relay piston in response to fluid pressure established at the outlet port of said one port set to engage said valve seat with said other valve means and effect actuation thereof, and said rod means being movable independently of said relay piston in response to the resilient means movement of said one member to actuate said other valve means in the event of fluid pressure failure between the ports of said one port set.

3. A control valve comprising a housing having first and second inlet chambers therein, first and second valve control means movable in said housing and defining therewith first and second outlet chambers, first and second connecting passages in said housing between said first and second inlet and outlet chambers, respectively, first and second valve means normally urged to positions closing said first and second connecting passages to interrupt pressure fluid communication between said first and second inlet and outlet chambers, said first valve control means including a pair of concertedly and relatively movable members, an expansible fluid pressure control chamber defined between said members, and one of said members being movable in response to fluid pressure in said control chamber in excess of a predetermined value relative to the other of said members toward a normal operative position for concerted movement therewith, said first valve control means being normally movable in response to an applied force thereon to engage and move said first valve means to a position opening said first connecting passage and establishing pressure fluid communication between said first inlet and outlet chambers, an application chamber defined between said housing and said second valve control means and opposing said second outlet chamber, other means providing passage of the fluid pressure established in said first outlet chamber into said application chamber, said second valve control means being normally movable in response to establish fluid pressure in said application chamber to engage and move said second valve means to a position opening said second connecting passage and establishing pressure fluid communication between said second inlet and outlet chambers, resilient means for moving said one member from the normal operative position thereof independently of said other member when the fluid pressure in said control chamber is reduced below the predetermined value to automatically engage and actuate said first valve means, said second valve control means also being responsive to fluid pressure automatically established in said first outlet and application chambers to automatically actuate said second valve means, said second valve control means including a relay piston slidable in said housing between said application and second outlet chambers, rod means slidable in said relay piston and extending therethrough, said rod means having one end for given engagement with said one member and the other end thereof defining a valve seat for operative engagement with said second valve means, abutment means on said rod means for engagement with said relay piston, said relay piston and rod means being concertedly movable when said abutment means is engaged with said relay piston in response to established fluid pressure in said application chamber to engage said valve seat with said second valve means and then actuate said second valve means, and said rod means is also being movable independently of said relay piston in response to the resilient means movement of said one member to engage said valve seat and second valve means and then actuate said second valve means in the event of failure of fluid pressure in said first outlet chamber.

4. A control valve comprising a housing having a first bore and counterbore aligned therein with a second bore and counterbore, first inlet and outlet ports connected with said first bore and counterbore and second inlet and outlet ports connected with said second bore and counterbore, respectively, first and second passages in said housing respectively interconnecting said first and second bores and counterbores first and second valve seats on said housing in circumscribing relation with said first and second passages and facing said first and second bores, first and second valves in said first and second bores and normally urged into engagement with said first and second valve seats interrupting pressure fluid communication between said first and second inlet and outlet ports, respectively, an exhaust opening in said first valve normally venting said first outlet port to the atmosphere, a control port in said housing connected with said first counterbore, a first piston slidable in said first counterbore between said first outlet port and said control port, a pair of stepped bores extending axially through said first piston, a second piston slidable in the larger of said stepped bores, a first extension on said second piston slidable in the smaller of said stepped bores and extending into said first counterbore, a third valve seat on said first extension for operative engagement with said first valve about said exhaust opening, a first expansible fluid pressure chamber defined in said larger stepped bore between said first and second pistons, means within said housing including said first piston providing passage means connecting said first chamber in pressure fluid communication with said control port, said second piston being movable in response to fluid pressure at said control port in excess of a predetermined value relative to said first piston toward a normal operative position for concerted movement therewith, first abutment means on said first piston for engagement with said second piston and defining the normal operative position thereof, said first and second pistons being concertedly movable in response to an applied force when the fluid pressure at said control port exceeds the predetermined value to initially engage said third valve seat with said first valve closing the exhaust opening therein and thereafter move said first valve to a position disengaged from said first valve seat and establishing pressure fluid communication between said first inlet and outlet ports, a third piston slidable in said second counterbore, a second expansible fluid pressure chamber defined in said second counterbore on one side of said third piston, another bore in said third piston, a rod slidable in said third piston bore and having opposed ends, one of said ends extending through said housing and the exhaust opening of said first valve into abutment with said second piston and the other end thereof defining a fourth valve seat for operative engagement with said second valve, second abutment means on said rod adjacent to said other end thereof and normally engaged with said third piston, and a third passage in said housing connecting said first outlet port in pressure fluid communication with said second chamber, said third piston and said rod being concertedly movable in response to established fluid pressure at said first outlet port to engage said fourth valve seat with said second valve and thereafter move said second valve to a position disengaged from said second valve seat and establishing pressure fluid communication between said second inlet and outlet ports, and resilient means urging said second piston to oppose fluid pressure expansion of said first chamber, said second piston being moved by said resilient means from the normal operative position thereof and independently of said first piston when the fluid pressure at said control port is reduced below the predetermined value to actuate said first valve and thereby automatically establish pressure fluid communication between said first inlet and outlet ports, said third piston and rod also being responsive to fluid pressure automatically established at said first outlet port to automatically actuate said second valve, and said rod also being mechanically moved independently of said third piston upon the independent resilient means movement of said second piston to mechanically actuate said second valve in the event of fluid pressure failure at said first outlet port.

5. A control valve comprising a housing, means within said housing providing a pair of pressure fluid flow passages therethrough including a pair of application means movable in said housing for controlling said flow passages, one of said application means including resiliently urged means defining therein an expansible fluid pressure control chamber, the other of said application means also defining with said housing another expansible fluid pressure chamber connected in pressure fluid communication with one of said flow passages, said one application means being normally movable in response to an applied force thereon to a position in said one flow passage establishing pressure fluid flow therethrough and the other of said application means being normally movable in response to established fluid pressure in said other chamber to a position in the other of said flow passages establishing pressure fluid flow therethrough, said resiliently urged means being independently movable in response to fluid pressure in said control chamber less than a predetermined value to a position in said one flow passage automatically establishing pressure fluid flow therethrough and actuating said other application means, and said other application means including a pair of concertedly and relatively movable members, said members being concertedly movable in response to the established fluid pressure in said other chamber to establish pressure fluid flow through said other flow passage, and force transmitting means for engagement between said one application means and one of said members, said force transmitting means being movable in response to the applied force movement of said one application means in the event of fluid pressure failure in said one flow passage to move said one member relative to the other of said members to also establish pressure fluid flow through said other flow passage, and said force transmitting means also being movable in response to the independent movement of said resiliently urged means to actuate said one member.

6. The control valve according to claim 5 comprising a reaction area on said other member subjected to the established fluid pressure in said other flow passage, said other member being urged into abutment with said housing to transfer thereto the reaction force of the fluid pressure in said other flow passage acting on said other member reaction area and established in response to the applied force movement of said one member upon the failure of fluid pressure in said one flow passage.

7. A control valve comprising a housing, means within said housing providing a pair of pressure fluid flow passages therethrough including a pair of application means movable in said housing for controlling said flow passages, one of said application means including resiliently urged means defining therein an expansible fluid pressure control chamber, the other of said application means also defining with said housing another expansible fluid pressure chamber connected in pressure fluid communication with one of said flow passages, said one application means being normally movable in response to an applied force thereon to a position in said one flow passage establishing pressure fluid flow therethrough and the other of said application means being normally movable in response to established fluid pressure in said other chamber to a position in the other of said flow passages establishing pressure fluid flow therethrough, said resiliently urged means being independently movable in response to fluid pressure in said control chamber less than a predetermined value to a position in said one flow passage automatically establishing pressure fluid flow therethrough and actuating said other application means, and said other application means including a pair of concertedly and relatively movable members, said members being concertedly movable in response to fluid pressure in said other chamber to establish pressure fluid flow through said other flow passage, means for connection in driving engagement between said resiliently urged means and one of said members to move said one member relative to the other of said members and establish pressure fluid flow through said other flow passage in response to the independent movement of said resiliently urged means and upon the failure of fluid pressure in said one flow passage, and means on said other member urged into engagement with said housing to transfer thereto the reaction force of the fluid pressure in said other flow passage acting on said other member and established upon the relative movement of said one member.

8. A control valve comprising a housing, means within said housing providing a pressure fluid flow passage therethrough including movable means for controlling said flow passage, said movable means being movable in response to an applied force toward a position in said flow passage establishing pressure fluid flow therethrough, a pair of application means cencertedly and relatively movable in said housing and defining with said housing another pressure fluid flow passage therethrough and an expansible fluid pressure chamber in opposed relation to said other flow passage and connected in pressure fluid communication with said first named flow passage, said application means being concertedly movable in response to etablished fluid pressure in said chamber toward a position in said other flow passage establishing pressure fluid flow therethrough, and means for transmitting the applied force from said movable means to one of said application means upon the failure of fluid pressure in said first named flow passage, said one application means being movable relative to the other of said application means to establish pressure fluid flow through said other flow passage when the applied force is transmitted thereto through said last named means.

9. The control valve according to claim 8 including means on said other application means urged into engagement with said housing to transfer thereto the reaction force of the fluid pressure in said other flow passage acting on said other application means and established upon the applied force movement of said one application means.

10. A control valve comprising a housing, a pair of application means movable in said housing and defining with said housing a pair of pressure fluid flow passages therethrough, one of said application means being movable in response to an applied force toward a position in one of said flow passages establishing pressure fluid flow therethrough, the other of said application means also defining with said housing an expansible fluid pressure chamber connected in pressure fluid communication with said one flow passage, said other application means being movable in response to establish fluid pressure in said chamber toward a position in the other of said flow passages establishing fluid pressure flow therethrough, said other application means including a pair of concertedly and relatively movable members, said members being concertedly movable in response to fluid pressure in said chamber to establish fluid pressure in said other flow passage, and means defining a connection between said one application means and one of said members, said last named means being movable in response to the applied force movement of said one application means to move said one member relative to the other of said members and establish pressure fluid flow through said other flow passage in the event of fluid pressure failure in said one flow passage.

11. The control valve according to claim 10 comprising a reaction area on said other member subjected to the establish fluid pressure in said other flow passage, said other member being urged into engagement with said housing to transfer thereto the reaction force of the fluid pressure in said other flow passage acting on said other member reaction area upon the failure of fluid pressure in said one flow passage.

12. The control valve according to claim 10 comprising abutment means between said members and providing concerted movement thereof in response to establish fluid pressure in said chamber.

13. A control valve comprising a housing having a pair of sets of ports therein, each port set including inlet and outlet ports, a pair of valve means controlling pressure fluid communication between the ports of said port sets, respectively, a pair of valve control means movable in said housing for operative engagement with said valve means, one of said valve control means being movable in response to an applied force to engage and move one of said valve means to a position establishing pressure fluid communication between the ports of one of said port sets, the other of said valve control means defining with said housing an expansible fluid pressure chamber connected in pressure fluid communication with the outlet port of said one port set, said other valve control means being movable in response to the established fluid pressure at the outlet port of said one port set to engage and move the other of said valve means to a position establishing pressure fluid communication between the ports of the other of said port sets, said other valve control means including a pair of concertedly and relatively movable members, said members being concertedly movable to actuate said other valve means in response to establish fluid pressure at the outlet port of said one port set, and means defining a connection between one of said members and said one valve control means, said last named means being movable in response to the applied force movement of said one valve control means to move said one member relative to the other of said members and actuate said other valve means in the event of fluid pressure failure at the outlet port of said one port set.

14. The control valve according to claim 13 comprising abutment means between said members and providing concerted movement thereof in response to the established fluid pressure at the outlet port of said one port set.

15. The control valve according to claim 13 including other means on said other member urged into engagement with said housing to transfer thereto the reaction force of the fluid pressure at the outlet port of said other port set acting on said other member and established upon the actuation of said other valve means in response to the applied force movement of said one member.

16. The control valve according to claim 13 comprising a pair of valve seats on said housing between the ports of said one and other port sets, respectively, said valve means being normally urged into engagement with said valve seats to interrupt pressure fluid communication between the ports of said one and other port sets, and an opening extending through said one valve means, said last named means including a rod member extending through said opening and one of said valve seats and having opposed ends thereon, one of said opposed ends being connected with said one member and the other of said opposed ends defining an abutment for driven engagement with said one valve control means.

17. The control valve according to claim 13 comprising a reaction area on said other member responsive to the established fluid pressure at the outlet port of said other port set, said other member being urged into engagement with said housing to transfer thereto the reaction force of the fluid pressure at the outlet port of said other port set acting on said reaction area and established in response to the applied force movement of said one member upon the failure of the established fluid pressure at the outlet port of said one port set.

18. The control valve according to claim 13 comprising opposed abutment means on said housing and said other member and in said chamber, opposed effective areas on said other member in said chamber and said other flow passage and responsive to the established fluid pressures at the outlet ports of said one and other port sets, respectively, said other means being urged in a direction to engage its abutment means with the housing abutment means to transfer to said housing the force of the established fluid pressure at the outlet port of said other port set acting on one of the opposed effective areas of said other member upon the failure of the fluid pressure at the outlet port of said one port set.

References Cited by the Examiner

UNITED STATES PATENTS 3,152,844   10/1964   Bueler _____ 303—52

EUGENE G. BOTZ, *Primary Examiner.*